UNITED STATES PATENT OFFICE.

MAURICE PERYER, OF CHRISTCHURCH, NEW ZEALAND.

COMPOSITION FOR CLEANING SMOOTH SURFACES.

SPECIFICATION forming part of Letters Patent No. 722,454, dated March 10, 1903.

Application filed September 24, 1902. Serial No. 124,635. (No specimens.)

*To all whom it may concern:*

Be it known that I, MAURICE PERYER, a subject of the King of Great Britain and Ireland, residing at Christchurch, New Zealand, have invented a new and useful Improved Composition for Cleaning Smooth Surfaces and Such as are Varnished; and I do hereby declare the following to be a full, clear, and exact description of the same.

This invention has for its object to provide a cheap and effective compound for removing a soot, grease, and other dirt that soon finds lodgment on brass and other work, and particularly on railway and other carriages, carts, sulkies, and all goods that are painted and varnished. It will also be found very efficacious for cleansing the windows of railway and other carriages. In the case of railway-carriage windows a film, which adheres thereto as the result of the mixture of smoke, steam, and oil, it is almost impossible to remove by ordinary methods; but with the aid of my composition no trouble is experienced in taking off all trace of the foreign matter from the glass.

Hitherto the preparations that have been used for the purposes above indicated have failed more or less in their object, and their use has sometimes resulted in damage to the appearance of the object treated, but after careful experiment I have found that my composition answers the purpose admirably for which it was devised. Railway-carriages that are nearly black with dirt have the appearance after treatment with my invention and when compared with other cars of having been newly painted.

After careful experiment with various ingredients I have found that the best results are obtained from a mixture consisting of the following ingredients: fifty - six pounds fine clay, seven pounds whiting, two pounds sugar, two pounds common salt, one pound borax, one-half pound pearlash.

The sugar may be left out of the compound, if desired.

The clay and also the whiting should be carefully selected, washed, and ground to remove all grit, and the whole may with advantage be afterward pulped with water and strained through a filter. After filtering the water is decanted off and the other ingredients are added to the clay and the whole is well worked and kneaded together.

The resulting compound may be put up in tins for marketing, or it may be formed into briquets and dried.

The preparation is applied to the varnished or other surface on a moist scouring-flannel, which surface is afterward thoroughly rinsed with clean water.

My invention may also be used to clean brasswork and other metal work, unvarnished paint, and indeed for cleansing almost any smooth surface.

Having now particularly described and ascertained the nature of my said invention and in what manner the same is to be performed, I declare that what I claim is—

1. The composition of matter, consisting of fine clay, whiting, common salt, borax and pearlash, substantially as described; for the purpose specified.

2. The composition of matter herein described, for cleaning smooth or varnished surfaces, consisting of fine clay, whiting, sugar, common salt, borax, and pearlash in about the proportions stated.

In testimony whereof I have signed this specification, in the presence of two subscribing witnesses, this 19th day of August, 1902.

MAURICE PERYER.

Witnesses:
 P. M. NEWTON,
 RICHARD W. THOMAS.